United States Patent [19]

Weaver

[11] Patent Number: 4,561,625
[45] Date of Patent: Dec. 31, 1985

[54] MOLD STRUCTURE

[75] Inventor: William R. Weaver, Toledo, Ohio

[73] Assignee: Libbey-Owens-Ford Company, Toledo, Ohio

[21] Appl. No.: 564,721

[22] Filed: Dec. 23, 1983

Related U.S. Application Data

[63] Continuation-in-part of Ser. No. 535,870, Sep. 26, 1983.

[51] Int. Cl.$^4$ .................. B29C 39/10; B29C 45/26
[52] U.S. Cl. .................................. 249/85; 249/160; 425/116; 425/127; 425/542
[58] Field of Search .................. 264/252; 249/83, 96, 249/95, 97, 65, 85; 425/117, 127, 116, 341, 110, 340

[56] References Cited

U.S. PATENT DOCUMENTS

| | | | |
|---|---|---|---|
| 2,137,472 | 11/1938 | Forbes | 425/116 |
| 2,579,072 | 12/1951 | Harris | 249/96 |
| 2,736,067 | 2/1956 | Boschi | 264/275 |
| 3,183,285 | 5/1965 | Boylan | 425/117 |
| 3,263,014 | 7/1966 | Deisenroth | 425/127 |
| 3,314,640 | 4/1967 | Snow | 249/83 |
| 3,381,340 | 5/1968 | Chapin | 264/275 |
| 3,807,146 | 4/1974 | Witkowski | 264/252 |
| 4,336,009 | 6/1982 | Wolf | 249/83 |

FOREIGN PATENT DOCUMENTS 57-158481  9/1982  Japan.

OTHER PUBLICATIONS

Hodgman et al., Handbook of Chemistry And Physics, 28 Ed., Chem. Rubber Pub. Co., Cleveland (1944) pp. 1642/1643 Relied On.
Anon, Webster's New World Dictionary World Pub. (1957) p. 465 Relied On.

*Primary Examiner*—Willard E. Hoag
*Attorney, Agent, or Firm*—Phillip S. Oberlin

[57] ABSTRACT

The present invention relates to a mold structure for forming a polymeric gasket around a predetermined portion of a sheet of transparent material such as glass, for example. The mold structure includes two cooperating mold sections for defining a chamber for receiving the transparent sheet. A seal is positioned about the periphery of the chamber and is utilized to resiliently support the sheet within the chamber. Also, the seal cooperates with a predetermined portion of the transparent sheet for defining a gasket cavity having a configuration corresponding to the gasket to be formed on the sheet of transparent material. An inlet communicates with the gasket cavity and is utilized to introduce a flowable gasket material into the gasket cavity.

5 Claims, 7 Drawing Figures

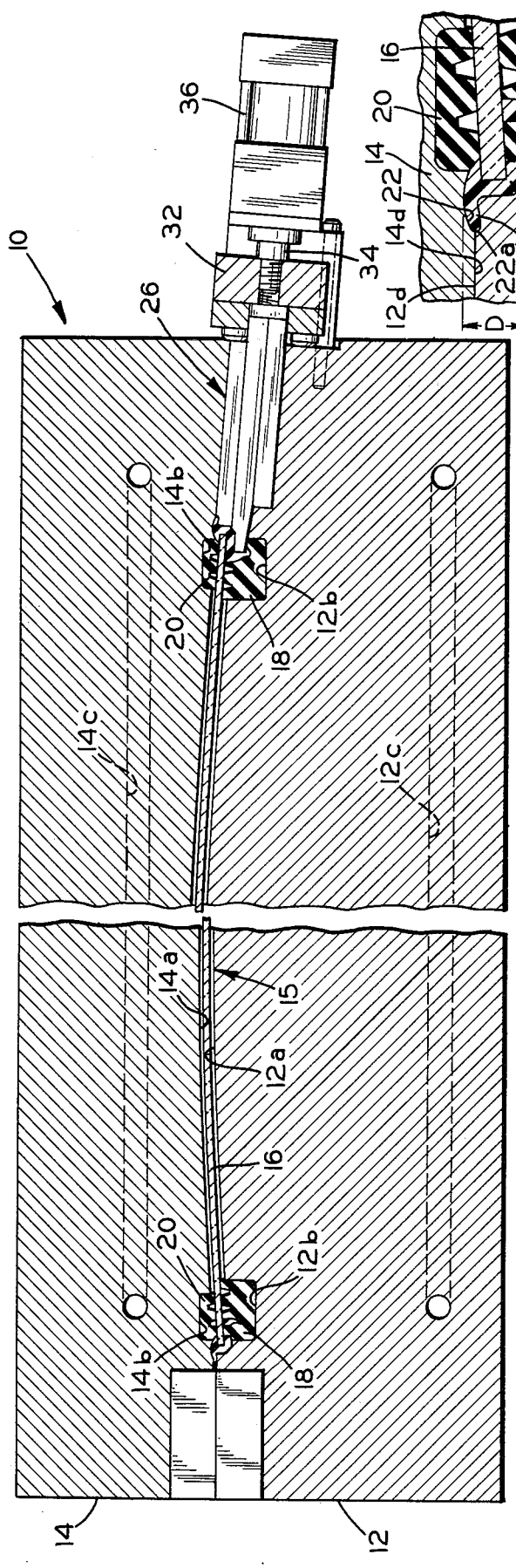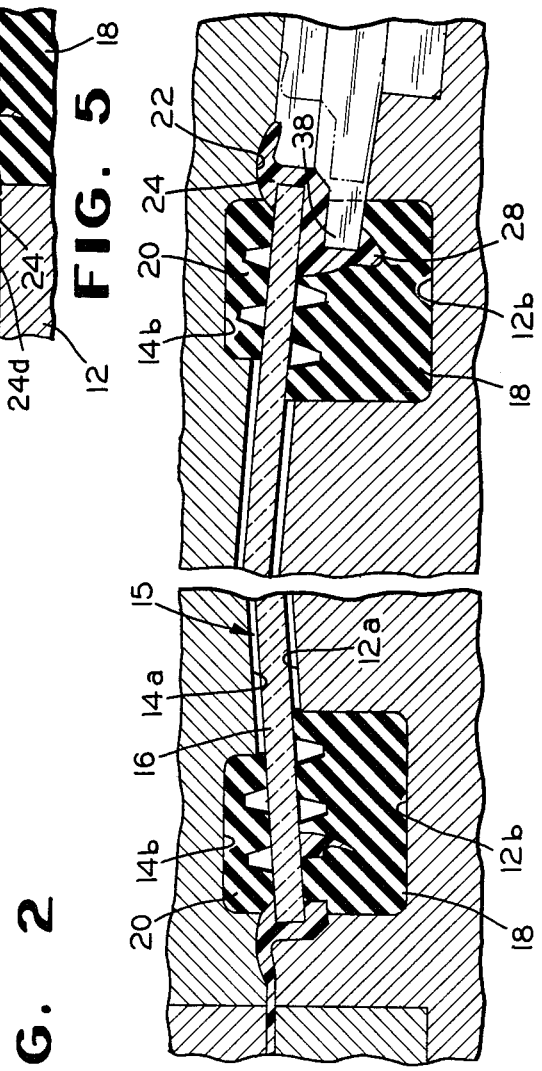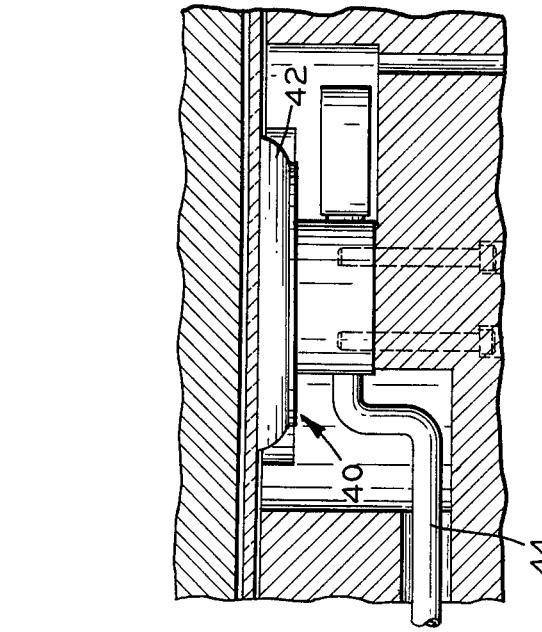

MOLD STRUCTURE

CROSS-REFERENCE TO RELATED APPLICATION

This application is a continuation-in-part of my copending application Ser. No. 535,870, filed Sept. 26, 1983.

BACKGROUND OF THE INVENTION

The present invention relates to a mold structure for producing a preformed window assembly and, in particular, to a mold structure for forming a gasket of a polymeric material on a predetermined portion of a sheet of transparent material, such as glass. The window assembly can be shaped to constitute a vehicle windshield or backlight, for example.

Initially, window assemblies for vehicles were comprised of a plurality of elements including adhesive sealants applied around the marginal edges of the glass sheet, suitable mechanical fasteners such as metal clips, and exterior decorative trim strips disposed to cover the junction between the marginal edges of the glass sheet and the adjacent portions of the vehicle frame. Such window structures were costly, especially from a labor standpoint, since it was necessary to assemble the individual elements along the vehicle assembly line.

Subsequently, in an endeavor to improve the above window structure, unitary window assemblies of the type illustrated in U.S. Pat. No. 4,072,340 were developed. These assemblies include a sheet of glass, an adjacent frame, and a casing or gasket of molded material, such as polyvinylchloride, extending between the frame and the peripheral edge of the window to hold the sheet of glass and the frame together. Fasteners are provided at spaced locations along the frame such that the entire assembly can be guided into location over the opening in a vehicle body as a unit. Other types of unitary window assemblies are disclosed in U.S. Pat. No. 3,759,004 and 4,364,595. While such unitary window structures greatly reduce the time required to mount the window assembly in the associated vehicle, such structures are relatively costly, since the individual components required to produce each window assembly generally must be manually assembled.

SUMMARY OF THE INVENTION

The present invention relates o a mold structure for forming a gasket around a predetermined portion of a sheet of transparent material, such as glass, to produce a unitary window assembly. In this connection, the transparent sheet may comprise a single sheet or pane or an assembly of two or more sheets, for example, being comprised of a plurality of glass and plastic sheets laminated together to form an integral structure (e.g., an automobile windshield), and the term "sheet" as used herein and in the appended claims is intended to include such assemblies within its scope. The mold structure of the present invention greatly reduces the labor and material costs generally associated with producing a unitary window assembly.

In the preferred embodiment of the invention, the gasket is formed by curing a polymeric gasket forming material in situ on the glass sheet to encapsulate the marginal peripheral edge portion of the sheet. The gasket is typically formed by a reaction injection molding process. The assembly can be shaped to constitute a vehicle windshield or backlight, for example, in which case it can be readily inserted into an appropriately shaped opening surrounded by a vehicle frame member.

More specifically, the mold structure includes at least two cooperating mold sections each having a recessed portion formed therein in facing relationship to one another. The recessed portions cooperate to define a sheet receiving chamber for receiving a sheet of transparent material such as glass. A compressible seal means is positioned about the periphery of the chamber and functions to resiliently support the glass sheet within the chamber. In the preferred embodiment of the invention, each mold section includes a metallic main body portion, and the seal means maintains the glass sheet in spaced-apart relationship with the main body portions of the mold sections to prevent any glass-to-metal contact between the glass sheet and the metallic mold sections.

Also, the seal means cooperates with predetermined portions of the glass sheet and the mold sections for defining a gasket cavity having a configuration corresponding to the gasket to be formed on the glass sheet. In accordance with the present invention, the facing surfaces of mold sections disposed outwardly of the gasket forming cavity are in metal-to-metal contact with one another. This enables the amount the seal means is compressed and the dimensions of the gasket to be precisely controlled. Inlet means or gates are provided for introducing a flowable gasket forming material into the gasket cavity.

BRIEF DESCRIPTION OF THE DRAWINGS

The above, as well as other advantages of the present invention, will become readily apparent to those skilled in the art from the following detailed description of a preferred embodiment when considered in the light of the accompanying drawings, in which:

FIG. 2 is an enlarged fragmentary sectional view of the mold structure of FIG. 1 taken along the line 2—2 thereof;

FIG. 3 is an enlarged fragmentary sectional view of the mold structure showing cooperating seals for resiliently supporting a glass sheet during the production of a unitary window assembly;

FIG. 4 is an enlarged fragmentary sectional view of the vacuum head portion of the mold assembly of FIGS. 1 and 2 taken along line 4—4 of FIG. 1;

FIG. 5 is an enlarged fragmentary sectional view taken along the line 5—5 of FIG. 1 and showing the metal-to-metal contact between the facing surfaces of the mold sections outwardly of the gasket forming cavity;

DETAILED DESCRIPTION OF THE PREFERRED EMBODIMENT

Figure 1:
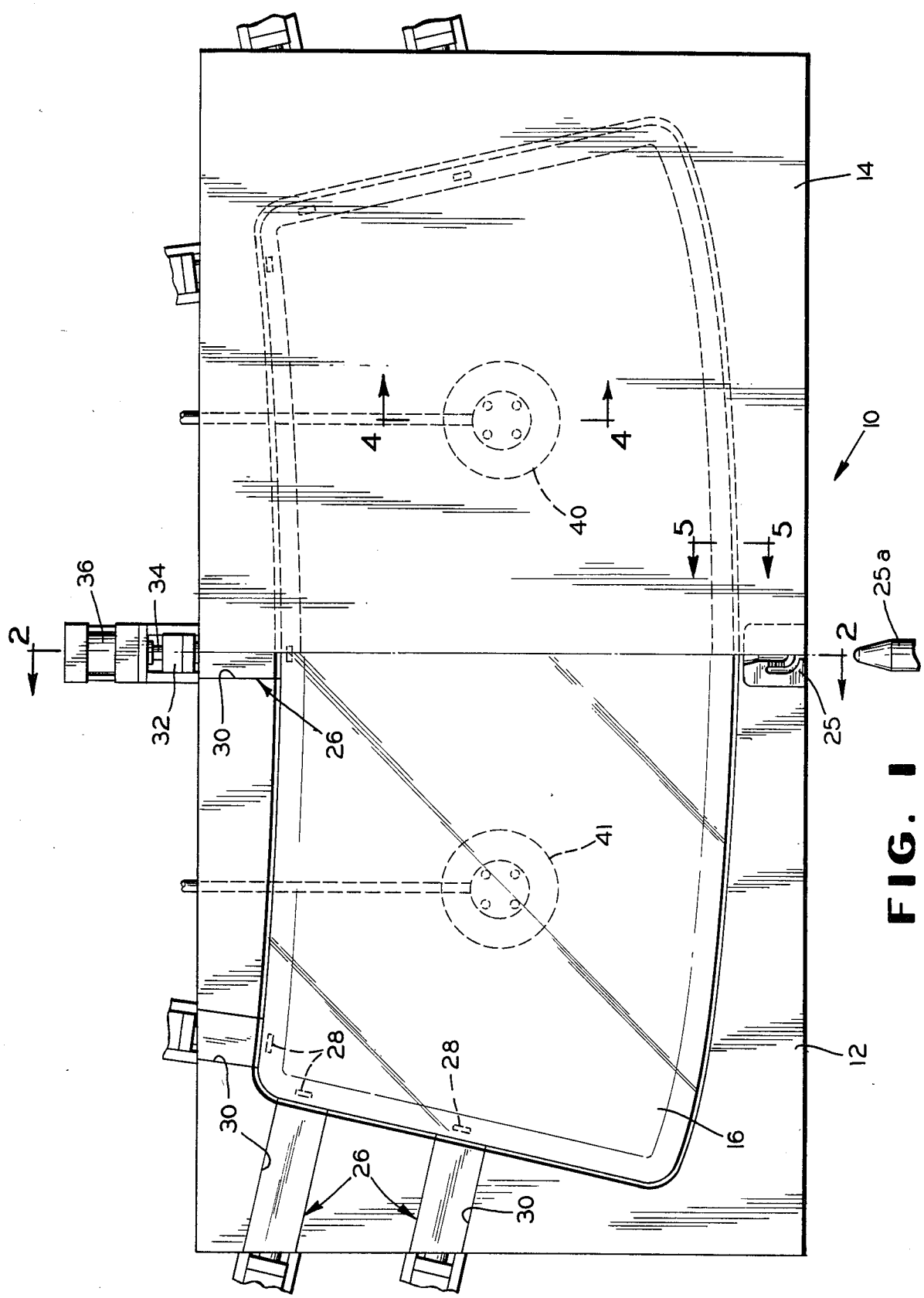
FIG. 1 is a top plan view of a mold structure embodying the features of the present invention.

Referring to FIGS. 1 through 5, there is shown a mold 10 embodying the features of the present invention. As will be discussed, the mold 10 is specifically adapted to form a gasket about the periphery of a glass sheet such as an automobile backlight, for example. The mold 10 is comprised of a lower section 12 (a top plan view of which is shown in the left hand portion of FIG. 1) and an upper section 14 (a top plan view of which is shown in the right hand portion of FIG. 1). While the mold sections 12 and 14 are typically formed of a metallic material such as steel or aluminum, for example, other types of substantially non-resilient material can be used. Suitable means, not shown, are provided to open and close the mold sections 12 and 14. Also, each of the mold sections 12 and 14 can be provided with passageways 12c and 14c (shown in FIG. 2) respectively for circulating a suitable coolant through the respective mold sections.

As shown in FIGS. 2 and 3, the mold sections 12 and 14 are provided with recessed portions 12a and 14a respectively in facing relationship to one another such that, when the mold sections are closed, the recessed portions 12a and 14a cooperate to define a sheet receiving or glass clearance chamber 15 for receiving a glass sheet 16 on which a gasket is to be formed. When the mold sections are open, the glass sheet 16 is positioned on the lower section 12 so that the outer peripheral portion of the lower surface of the glass rests on a resilient lower seal 18 positioned within a groove 12b formed in the upper surface of the lower section 12. After the glass sheet 16 is suitably positioned on the seal 18 of the lower mold section 12, the upper mold section 14 is lowered into position to enable the outer peripheral portions of the facing surfaces 12d and 14d of the cooperating mold sections 12 and 14 to be clamped together in metal-to-metal contact, as shown in FIG. 5. The upper mold section 14 carries a resilient upper seal 20 positioned in a groove 14b formed opposite the groove 12b. The upper seal 20 cooperates with the lower seal 18 to press yieldingly against the glass sheet 16 and resiliently support the glass sheet within the glass clearance chamber 15.

In the drawings, the chamber 15 of the mold 10 is slightly larger than the formed glass sheet 16 to avoid any glass-to-metal contact between the glass sheet 16 and the metallic mold sections 12 and 14. However, it will be appreciated that the glass clearance chamber 15 can be formed of any shape as long as the chamber is sufficiently large to avoid any glass-to-metal contact between the glass sheet and the metallic mold sections. For example, the portions of the mold sections 12 and 14 which are below and above the central portion of the glass sheet 16 can be removed such that each mold section will be generally ring-shaped.

The seals 18 and 20 are preferably formed of a silicone rubber material and can be secured within the respective grooves 12b and 14b by means of a suitable adhesive. Alternatively, the seals 18 and 20 can be releasably secured within the respective groove. This can be accomplished by providing tab portions (not shown) at spaced apart locations around the respective seal which can be inserted and releasably held within corresponding tab receiving apertures (not shown) formed at corresponding spaced apart locations around the respective groove.

In addition to resiliently supporting the glass sheet 16 within the glass clearance chamber 15, the seals 18 and 20 cooperate with selected portions of the glass sheet 16 and the mold sections 12 and 14 for defining a gasket forming cavity 22 utilized to form a gasket 24. The cavity 22 communicates with an inlet means or gate 25 for receiving a flowable polymeric gasket forming material from a nozzle member 25a. Typically, the gasket forming material is adapted to polymerize and cure in situ on the peripheral portion of the glass sheet 16. The gasket can be formed by a reaction injection molding process, for example.

As shown in FIG. 5, the mold sections 12 and 14 include facing surfaces 12d and 14d, respectively, which are in contact with one another outwardly of the gasket forming cavity 22 to define a parting line 22a. Since the glass sheet 16 is relatively fragile and is sometimes slightly off form, it is important to control the amount the seals 18 and 20 are compressed to avoid fracturing the glass. By enabling the two mold sections to come together in metal-to-metal contact at surfaces 12d and 14d, the amount the seals 18 and 20 are compressed can be controlled. Also, and most importantly, the fact that the vertical dimensions of the mold cavity and gasket within the area or height D (shown in FIG. 5) are determined by rigid surfaces of the mold and thus do not vary due to any compression of the seals or off form glass, enables all such vertical dimensions within this area, for example that of the lip 24d, to be precisely controlled.

A number of movable mold segments, indicated generally at 26, are provided at spaced locations around the periphery of the mold for forming tab portions 28 at selected points along the gasket 24. As will be discussed, the tab portions 28 are utilized as a locating and indexing means during the mounting of the window assembly onto an associated vehicle. All of the mold segments 26 are substantially identical and are slidably received in respective recesses 30 provided in the lower mold section 12. The outer end of each segment 26, in respect to the mold, is affixed to a block 32 which is operatively connected to the distal end of a reciprocal piston 34 of a conventional fluid operating cylinder 36. The opposite or inner end of each segment 26 terminates in a contour corresponding to the outer profile of the gasket 24 and includes an extension 38 which provides the undercut in the tab 28.

In operation, the piston rod 34 is extended, moving the mold segment 26 forwardly (FIG. 2) in readiness for receiving the flowable gasket forming material. Upon cure of the gasket material, the piston rod 34 and movable mold segment 26 are retracted, as shown in phantom in FIG. 3, withdrawing extension 38 from the undercut portion of tab 28, releasing the tab and freeing the window assembly for removal from the lower mold section 12.

The mold 10 also includes vacuum heads 40 and 41 shown in FIG. 1 in the lower mold section 12 of the mold to maintain the glass sheet 16 within the lower section 12 when the molding operation has been completed and it is desired to raise the upper mold section 14. As shown in FIG. 4, the vacuum head 40 consists primarily of a vacuum cup 42 which communicates with a source of vacuum (not shown) through a vacuum line 44. The vacuum head 41 can be similar to the vacuum head 40.

Figure 6:
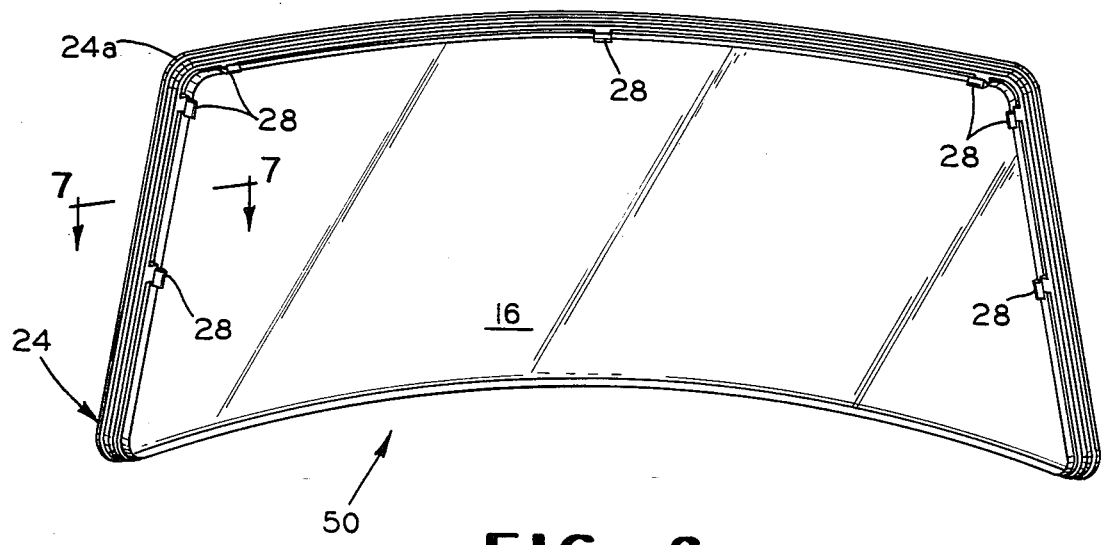
FIG. 6 is a rear elevational view of a unitary window assembly manufactured with the mold structure according to the invention.
Figure 7:
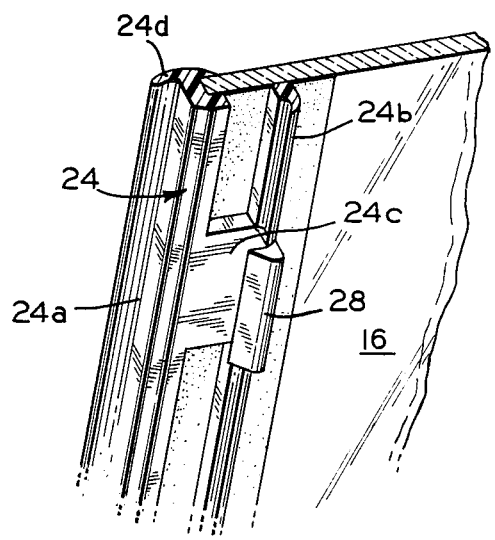
FIG. 7 is an enlarged fragmentary sectional view of the window assembly of FIG. 6 taken along the line 7—7 thereof.

Referring to FIGS. 6 and 7, there is shown an example of a window assembly 50 which can be manufactured with the mold structure of the present invention. The window assembly 50 includes the glass sheet 16 which is encapsulated on the front, rear, and peripheral edge portions by the gasket 24. The gasket 24 includes a trim portion 24a which surrounds the peripheral edge of the glass sheet 16 and is adapted to cover a gap between the peripheral edge of the glass sheet 16 and the metal of the vehicle body (not shown) which surrounds the opening to be closed by the window assembly. The gasket 24 also includes a rib or dam member 24b which is spaced inwardly on the rear surface of the gasket 24 by means of bridge members 24c. The zone between the trim portion 24a and the rib member 24b is adapted to confine a bead of suitable adhesive material used in mounting the window assembly.

The tabs 28 are integral with the gasket 24 and are utilized as a locating and indexing means during the mounting of the assembly onto an associated vehicle and to retain the assembly in place until the associated adhesive material cures to effect the desired bond between the assembly and the mating portion of the vehicle.

In accordance with the provisions of the patent statutes, the principles and mode of operation of the present invention have been described in what is considered to represent its preferred embodiment. However, it should be understood that the invention may be practiced otherwise than as specifically illustrated and described without departing from its spirit or scope.

What is claimed is:

1. A mold structure for forming a gasket on a predetermined portion of a frangible sheet comprising:
   at least two cooperating mold sections having facing surfaces defining a chamber for receiving the sheet;
   seal means positioned in said mold sections adjacent the periphery of the sheet to resiliently support the sheet within the sheet receiving chamber and in spaced relationship with portions of the mold facing surfaces located interiorly of said seal means;
   at least one of the facing surfaces of said mold sections located outwardly of the said seal means provided with a gasket shaping portion which cooperates with said seal means and the predetermined portion of the sheet to define a gasket forming cavity corresponding to the gasket to be formed on the sheet;
   at least a portion of the facing surfaces of said mold sections disposed outwardly of the gasket forming cavity adapted to contact one another, said mold sections being constructed of a rigid material such that the contact between the facing surfaces of said mold sections disposed outwardly of the gasket forming cavity limits the amount said seal means are compressed whereby the dimensions of the gasket forming cavity can be precisely controlled when said mold sections are in contacting relationship, said facing surfaces located inwardly of the contacting portions thereof delimiting said sheet receiving chamber; and
   inlet means for introducing a flowable gasket forming material into the gasket forming cavity when said mold sections are in contacting relationship.

2. The mold structure according to claim 1 wherein at least one of said mold sections includes a groove formed therein for receiving said seal means, and means for maintaining said seal means within said groove.

3. A mold structure for forming a gasket about the peripheral portion of a frangible sheet of transparent material comprising:
   a pair of cooperating mold sections having facing surfaces defining a chamber for receiving the sheet;
   seal means positioned in the facing surfaces of each of said mold sections adjacent to and coextensive with the periphery of the sheet to resiliently support the sheet within the sheet receiving chamber and in spaced relationship with the portion of the mold facing surfaces located interiorly of said seal means;
   at least one of the facing surfaces of said mold sections located exteriorly of said seal means provided with a gasket forming portion which cooperates with said seal means and the predetermined portion of the sheet to define a gasket forming cavity corresponding to the gasket to be formed on the sheet;
   at least a portion of the facing surfaces of said mold sections disposed outwardly of the gasket forming cavity adapted to contact one another, said mold sections being constructed of a rigid material such that the contact between the facing surfaces of said mold sections disposed outwardly of the gasket forming cavity limits the amount said seal means are compressed whereby the dimensions of the gasket forming cavity can be precisely controlled when said mold sections are in contacting relationship, said facing surfaces located inwardly of the contacting portions thereof delimiting said sheet receiving chamber; and
   inlet means for introducing a flowable gasket forming material into the gasket forming cavity when said mold sections are in contacting relationship.

4. The mold structure according to claim 3 wherein said mold sections include an upper mold section adapted for movement toward and away from a lower mold section, said lower mold section including means for maintaining the sheet on said lower mold section when said upper mold section is moved away from said lower mold section.

5. A mold structure for forming a gasket on a predetermined portion of a frangible sheet comprising:
   a pair of cooperating mold sections having facing surfaces defining a chamber for receiving the sheet;
   seal means positioned in the facing surfaces of each of said mold sections adjacent the periphery of the sheet to resiliently support the sheet within the sheet receiving chamber and in spaced relationship with the portions of the mold facing surfaces located interiorly of said seal means;
   each of the facing surfaces of said mold sections provided with a separate gasket forming portion which cooperates with said seal means and the predetermined portion of the sheet to define a gasket forming cavity corresponding to the gasket to be formed on the sheet;
   at least a portion of the facing surfaces of said mold sections disposed outwardly of the gasket forming cavity adapted to contact one another, said mold sections being constructed of a rigid material such that contact between the facing surfaces of said mold sections disposed outwardly of the gasket forming cavity limits the amount said seal means are compressed to space said separate gasket forming portions apart a predetermined distance when said mold sections are in contacting relationship, said facing surfaces located inwardly of the contacting portions thereof delimiting said sheet receiving chamber; and
   inlet means for introducing a flowable gasket forming material into the gasket forming cavity when said mold sections are in contacting relationship.

* * * * *